(12) United States Patent
Tang

(10) Patent No.: US 7,396,125 B1
(45) Date of Patent: Jul. 8, 2008

(54) EYEGLASSES WITH ANGLE-ADJUSTABLE TEMPLES

(75) Inventor: Shun-Tien Tang, Yung-Kang (TW)

(73) Assignee: All-Logic Int. Co., Ltd. (TW)

( * ) Notice: Subject to any disclaimer, the term of this patent is extended or adjusted under 35 U.S.C. 154(b) by 0 days.

(21) Appl. No.: 11/979,998

(22) Filed: Nov. 13, 2007

(51) Int. Cl.
*G02C 5/14* (2006.01)
(52) U.S. Cl. .................. 351/120; 351/118; 351/119
(58) Field of Classification Search .............. 351/120, 351/118, 119, 111, 110, 41, 158, 63
See application file for complete search history.

(56) References Cited

U.S. PATENT DOCUMENTS 6,776,483 B1 * 8/2004 Wu .................. 351/120

7,104,646 B2 * 9/2006 Yang ................ 351/120

* cited by examiner

*Primary Examiner*—Hung X Dang
(74) *Attorney, Agent, or Firm*—Davidson Berquist Jackson & Gowdey LLP

(57) ABSTRACT

Eyeglasses include a pair of temples, and a lens frame assembly. Each of the temples has a front end portion that is formed with a recess. Each temple includes a first positioning protrusion that is disposed in the recess and that defines a first abutment face formed with a plurality of first teeth. The lens frame assembly includes a pair of connectors extending rearwardly, and that are pivotally and respectively disposed in the recesses. Each connector has a rearward end defining a second abutment face that is formed with a plurality of second teeth that mesh selectively with the first teeth to thereby allow for vertical adjustment of the temples. Each of the first and second abutment faces has a first vertical edge and a second vertical edge, and is slanted such that the first vertical edge is more forwardly positioned than the second vertical edge.

7 Claims, 7 Drawing Sheets

EYEGLASSES WITH ANGLE-ADJUSTABLE TEMPLES

BACKGROUND OF THE INVENTION

1. Field of the Invention

This invention relates to eyeglasses, more particularly to eyeglasses with angle-adjustable temples.

2. Description of the Related Art

Referring to FIG. 1, conventional eyeglasses include a frame 11, a pair of pivot parts 12 respectively mounted to lateral ends of the frame 11, and a pair of temples 13, each of which is coupled to a respective one of the pivot parts 12 so that it is rotatable in a vertical direction. Each of the pivot parts 12 includes a plurality of vertically spaced apart first ridged teeth 121. A front end of each of the temples 13 includes a recess 131 for receiving the respective one of the pivot parts 12, and a front abutting face 132 for abutting against the respective one of the pivot parts 12. The front abutting face 132 is formed with a plurality of vertically spaced apart second ridged teeth 133 that mesh with the first ridged teeth 121 in a manner to permit the vertical movement of the temples 13.

A problem associated with the conventional design is that the second ridged teeth 133 may not tightly mesh with the first ridged teeth 121. That is, with reference to FIG. 2, a wearer typically applies an outward force to the temples 13 immediately prior to effecting vertical adjustment of the same. Due to the application of such a force, the first and second ridged teeth 133, 121 may no longer tightly engage each other, particularly at areas adjacent to inner surfaces of the temples 13. As a result, precise adjustment of the temples 13 may not be possible. For example, the wearer may not readily perceive the extremely slight sensations involved in adjustment of the temples 13, such that the wearer may face difficulty in adjusting the temples 13 by only a minute amount.

SUMMARY OF THE INVENTION

Therefore, it is an object of the present invention to provide eyeglasses that are capable of overcoming the above-mentioned drawbacks of the prior art.

According to the present invention, eyeglasses include a pair of temples, and a lens frame assembly. Each of the temples has a front end portion, and inner and outer surfaces respectively adjacent to and distal from a wearer's face. The front end portion of each of the temples is formed with a recess. Further, each of the temples includes a first positioning protrusion that is disposed in the recess and that defines a first abutment face formed with a plurality of vertically spaced apart first teeth.

The lens frame assembly includes a pair of connectors extending rearwardly from opposite left and right ends of the lens frame assembly, and that are pivotally and respectively disposed in the recesses of the temples. Each of the connectors has a rearward end defining a second abutment face that is formed with a plurality of vertically spaced apart second teeth that mesh selectively with the first teeth of the first abutment face of a respective one of the temples to thereby allow for vertical adjustment of the temples.

Moreover, each of the first and second abutment faces has a first vertical edge proximate to the inner surface of a respective one of the temples, and a second vertical edge proximate to the outer surface of the respective one of the temples. Each of the first and second abutment faces is slanted such that the first vertical edge is more forwardly positioned than the second vertical edge.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
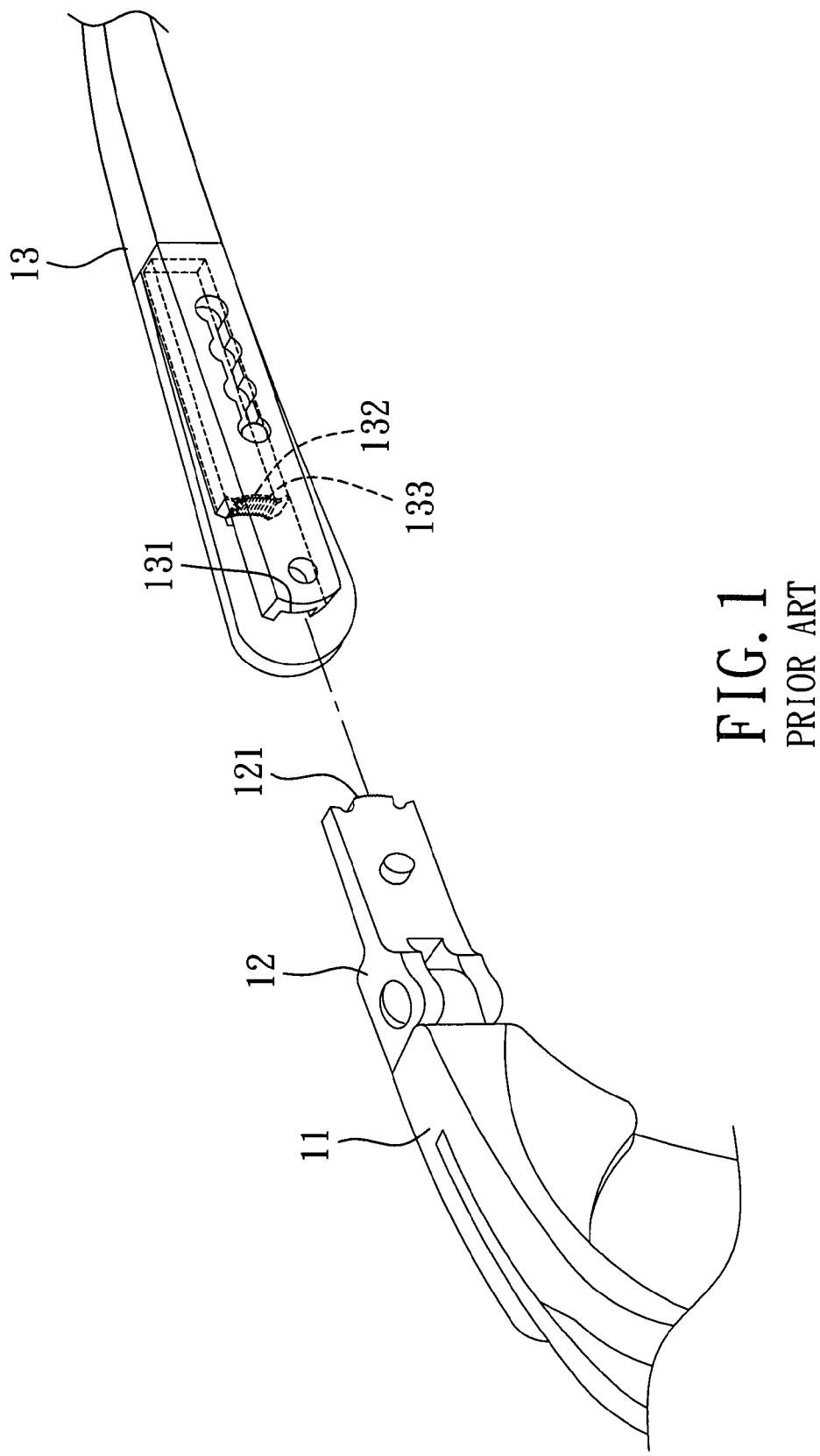
FIG. 1 is a fragmentary partly exploded perspective view of conventional eyeglasses.
Figure 2:
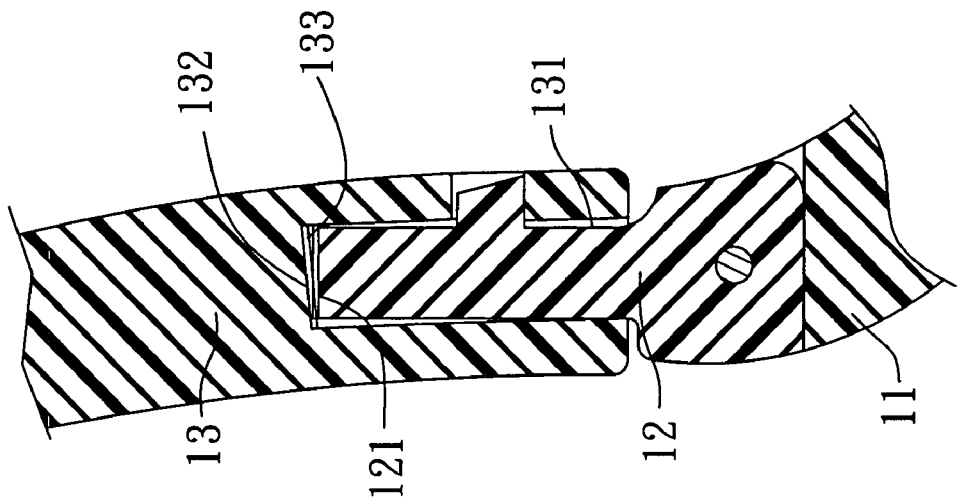
FIG. 2 shows top sectional views of FIG. 1, illustrating a temple of the eyeglasses as it undergoes vertical adjustment.
Figure 2:
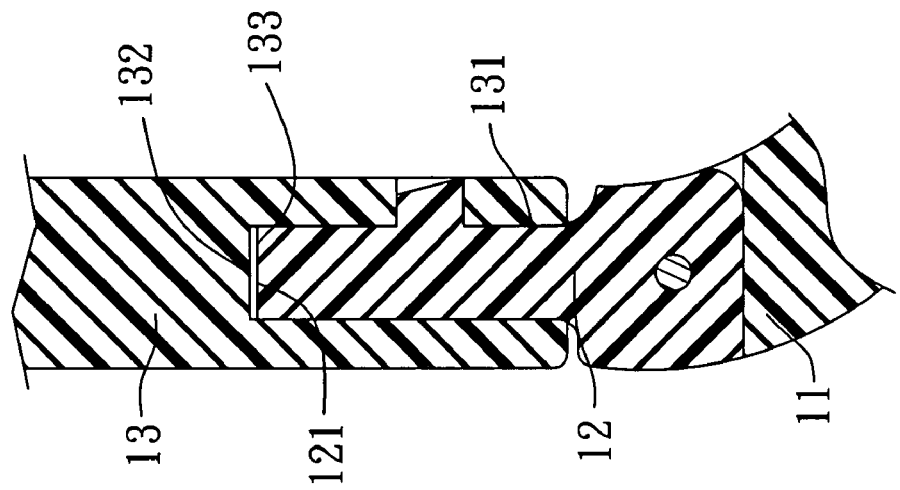
Figure 3:
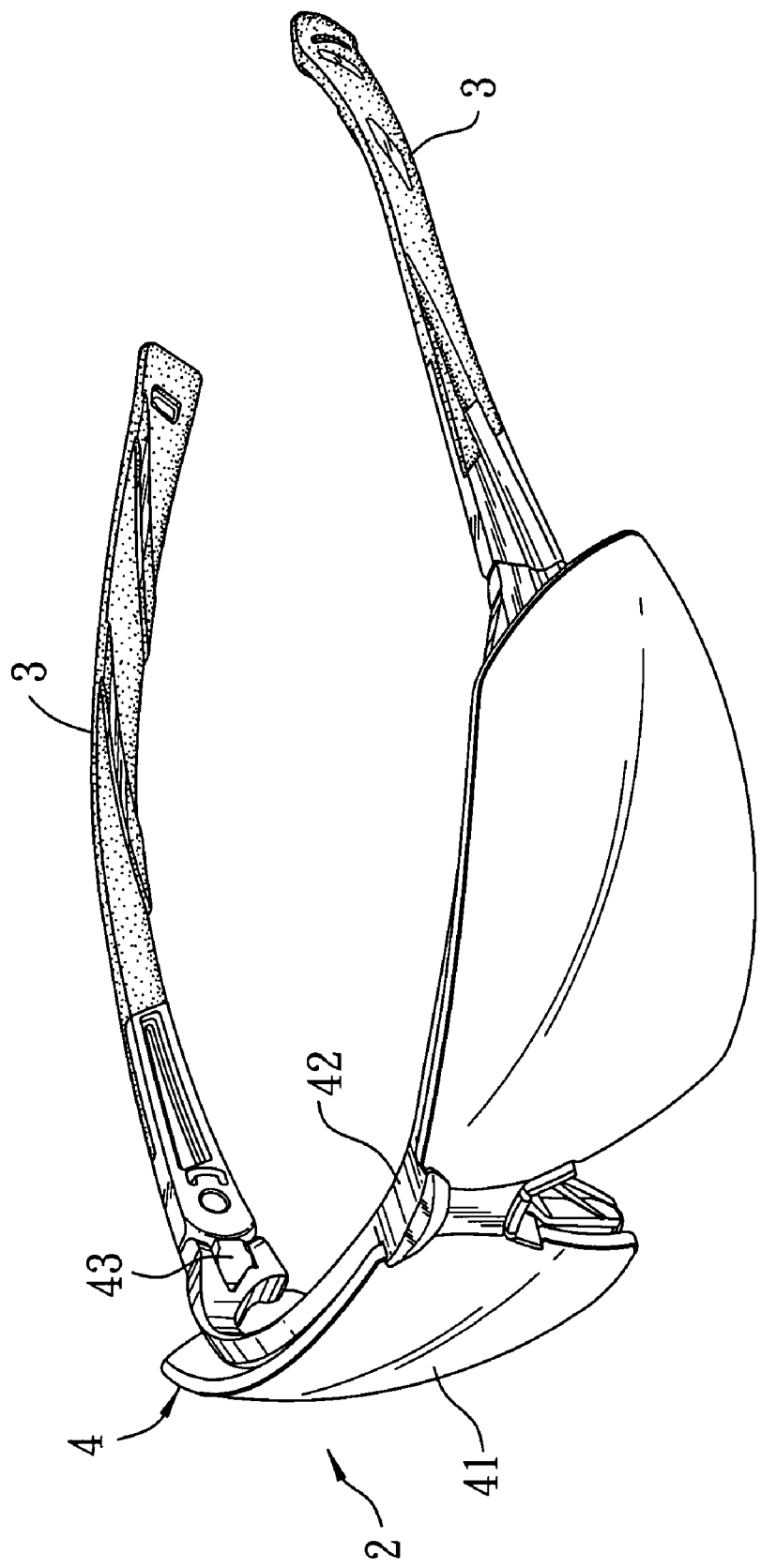
FIG. 3 is a perspective view of the preferred embodiment of eyeglasses according to the present invention.

As illustrated in FIGS. 3 to 7, the preferred embodiment of eyeglasses 2 according to the present invention include a pair of temples 3, and a lens frame assembly 4. Each of the temples 3 has a front end portion 34, and inner and outer surfaces 31, 32 respectively adjacent to and distal from a wearer's face. The front end portion 34 of each of the temples 3 is formed with a recess 30. Further, each of the temples 3 includes a first positioning protrusion 35 that is disposed in the recess 30 and that defines a first abutment face 36 formed with a plurality of vertically spaced apart first teeth 361.

The lens frame assembly 4 includes a pair of connectors 43 extending rearwardly from opposite left and right ends of the lens frame assembly 4, and that are pivotally and respectively disposed in the recesses 30 of the temples 3. Each of the connectors 43 has a rearward end defining a second abutment face 434 that is formed with a plurality of vertically spaced apart second teeth 435 that mesh selectively with the first teeth 361 of the first abutment face 36 of a respective one of the temples 3 to thereby allow for vertical adjustment of the temples 3.

Moreover, each of the first and second abutment faces 36, 434 has a first vertical edge proximate to the inner surface 31 of a respective one of the temples 3, and a second vertical edge proximate to the outer surface 32 of the respective one of the temples 3. Each of the first and second abutment faces 36, 434 is slanted such that the first vertical edge is more forwardly positioned than the second vertical edge.

In the preferred embodiment, the first abutment face 36 is concavely shaped in the vertical direction, and the second abutment face 434 is convexly shaped in the vertical direction. In another embodiment, the first abutment face 36 may be convexly shaped in the vertical direction, and the second abutment face 434 may be concavely shaped in the vertical direction.

The inner surface 31 of each of the temples 3 is formed with a C-shaped aperture 312 that is in spatial communication with a respective one of the recesses 30. The aperture 312 is defined by interconnection of a top section 313, a bottom section 314, and a rear section 315 that surround respectively an upper, a lower, and a rear portion of a respective one of the first positioning protrusions 35. The first positioning protrusion 35 deforms resiliently when it is being pressed.

The inner surface 31 of each of the temples 3 is further formed with a pivot hole 311 in spatial communication with a respective one of the recesses 30. Each of the connectors 43 includes a joining member 431 disposed in the recess 30 of the respective one of the temples 3, a pivot member 432 protruding from an inner surface of the joining member 431 and rotatably disposed in the pivot hole 311 of the respective one of the temples 3, and a second positioning protrusion 433 extending rearwardly from the joining member 431 and defining the second abutment face 434 of the connector 43. Each of the temples 3 further includes a recessed track 316 that is formed as an extension of a respective one of the recesses 30 by being indented towards the inner surface 31 of the corresponding temple 3 for receiving a respective one of the pivot members 432 during assembly.

The lens frame assembly 4 further includes a frame 42 having the aforementioned left and right ends of the lens frame assembly 4, and a pair of lenses 41 mounted to the frame 42. The connectors 43 are mounted respectively to the frame 42 at the left and right ends of the lens frame assembly 4 through the joining members 431. In the preferred embodiment, the connectors 43 are mounted respectively to the left and right ends of the lens frame assembly 4 through the joining members 431. Further, in the preferred embodiment, the joining members 431 are respectively and pivotally mounted to the frame 42 at the left and right ends of the frame 42. In another embodiment, the joining members 431 may be respectively and fixedly mounted to the frame 42 at the left and right ends of the lens frame assembly 4.

Figure 4:
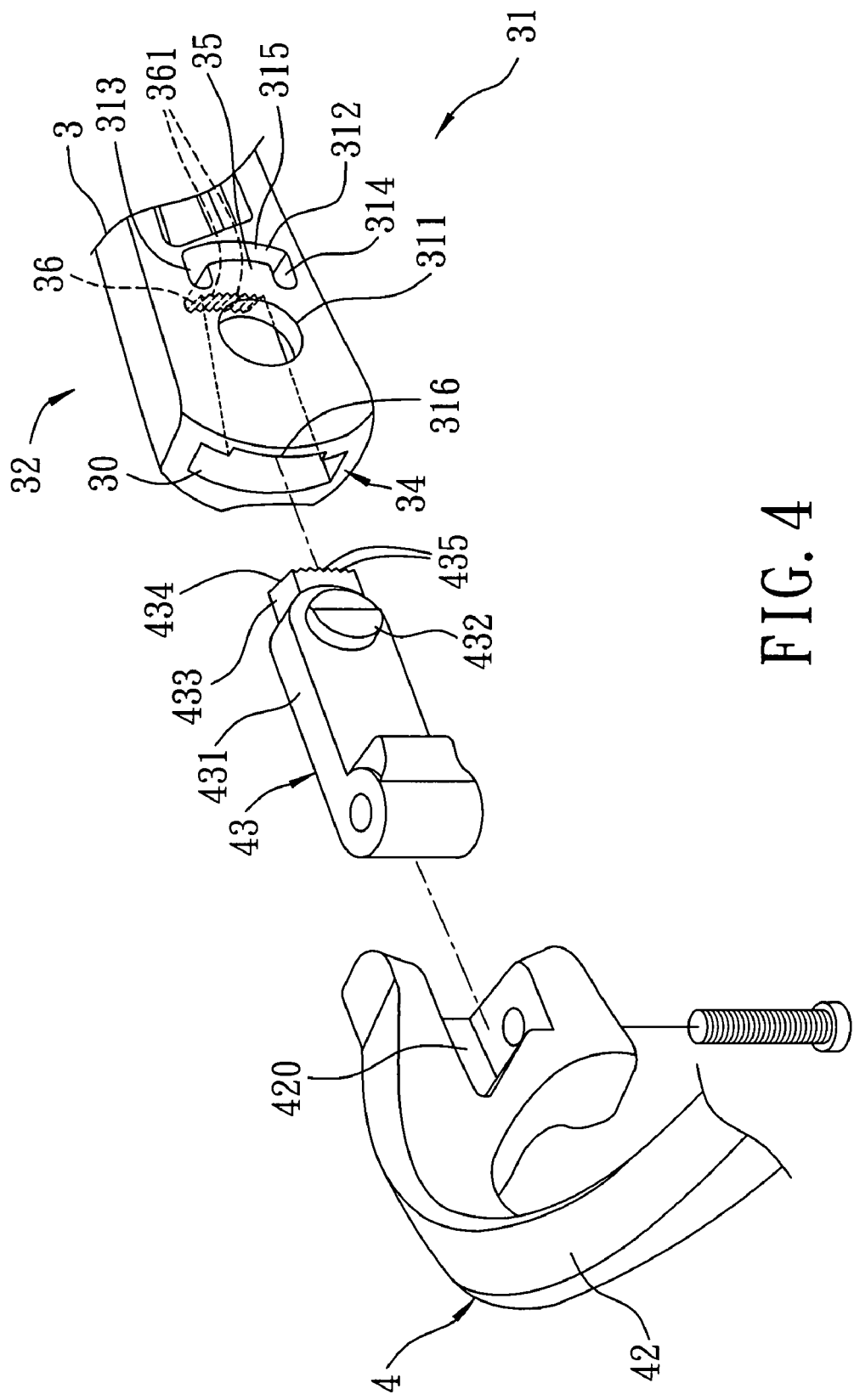
FIG. 4 is a fragmentary exploded perspective view of the preferred embodiment.
Figure 5:
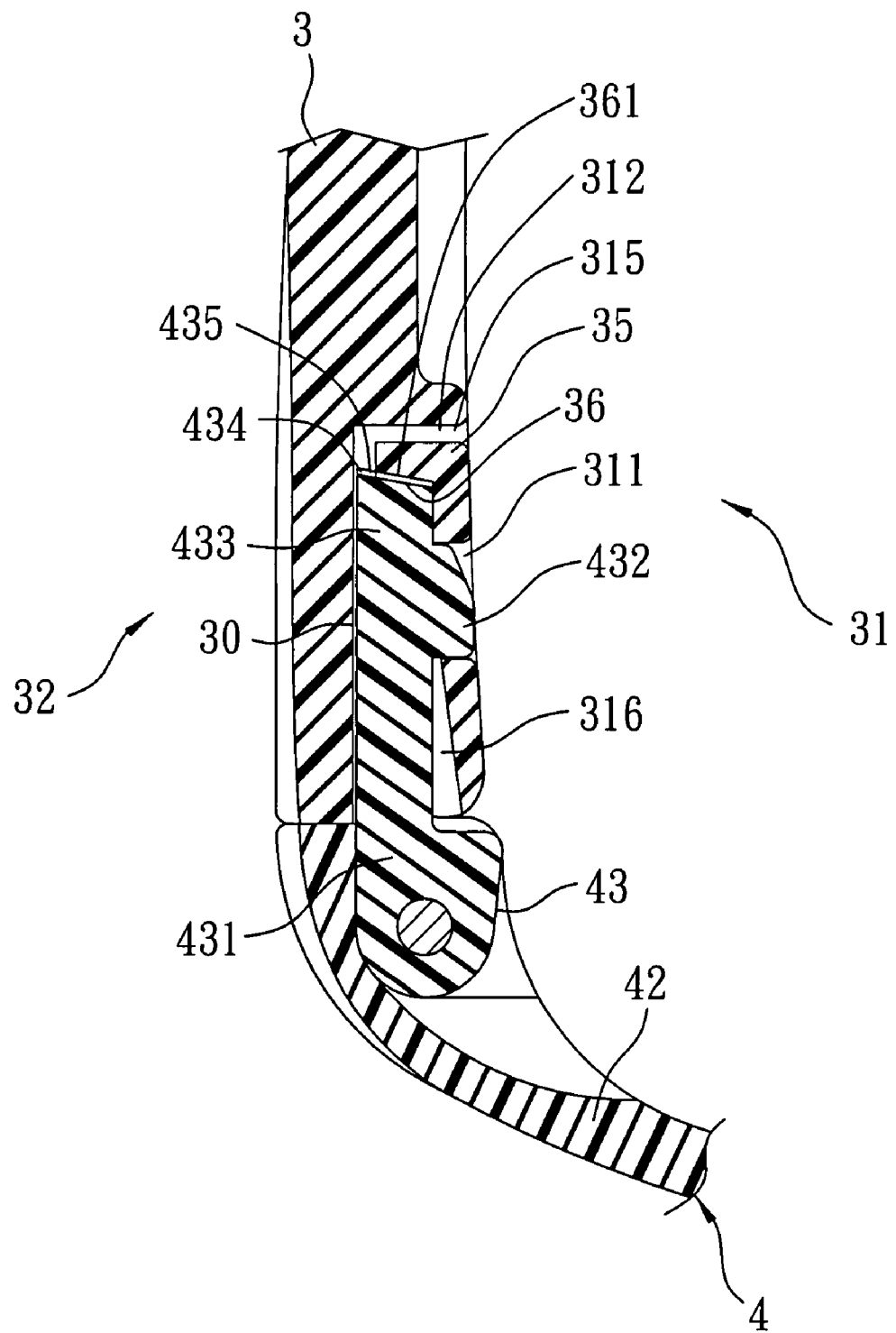
FIG. 5 is a fragmentary top sectional view of the preferred embodiment.
Figure 6:
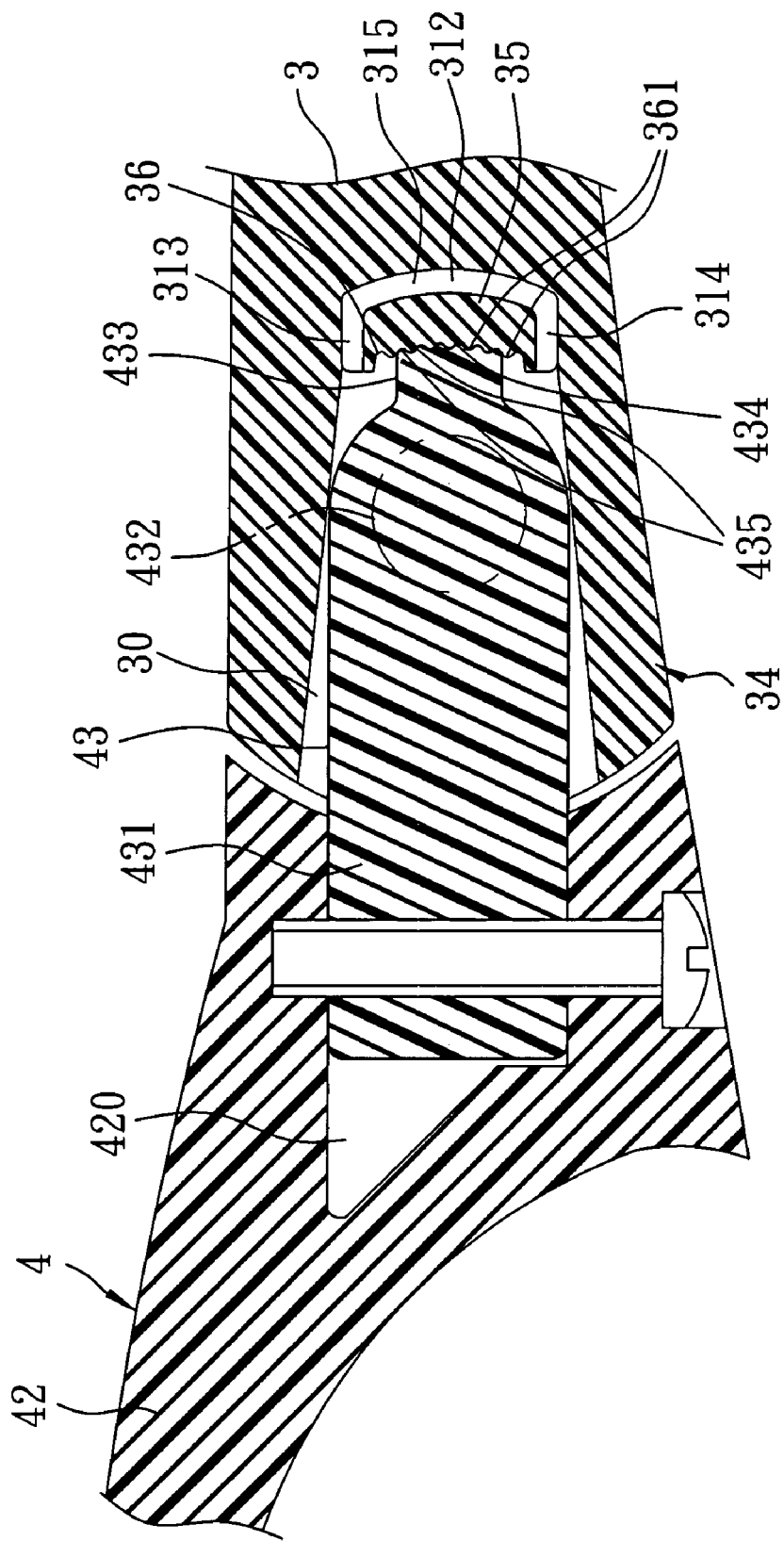
FIG. 6 is fragmentary side sectional view of the preferred embodiment.
Figure 7:
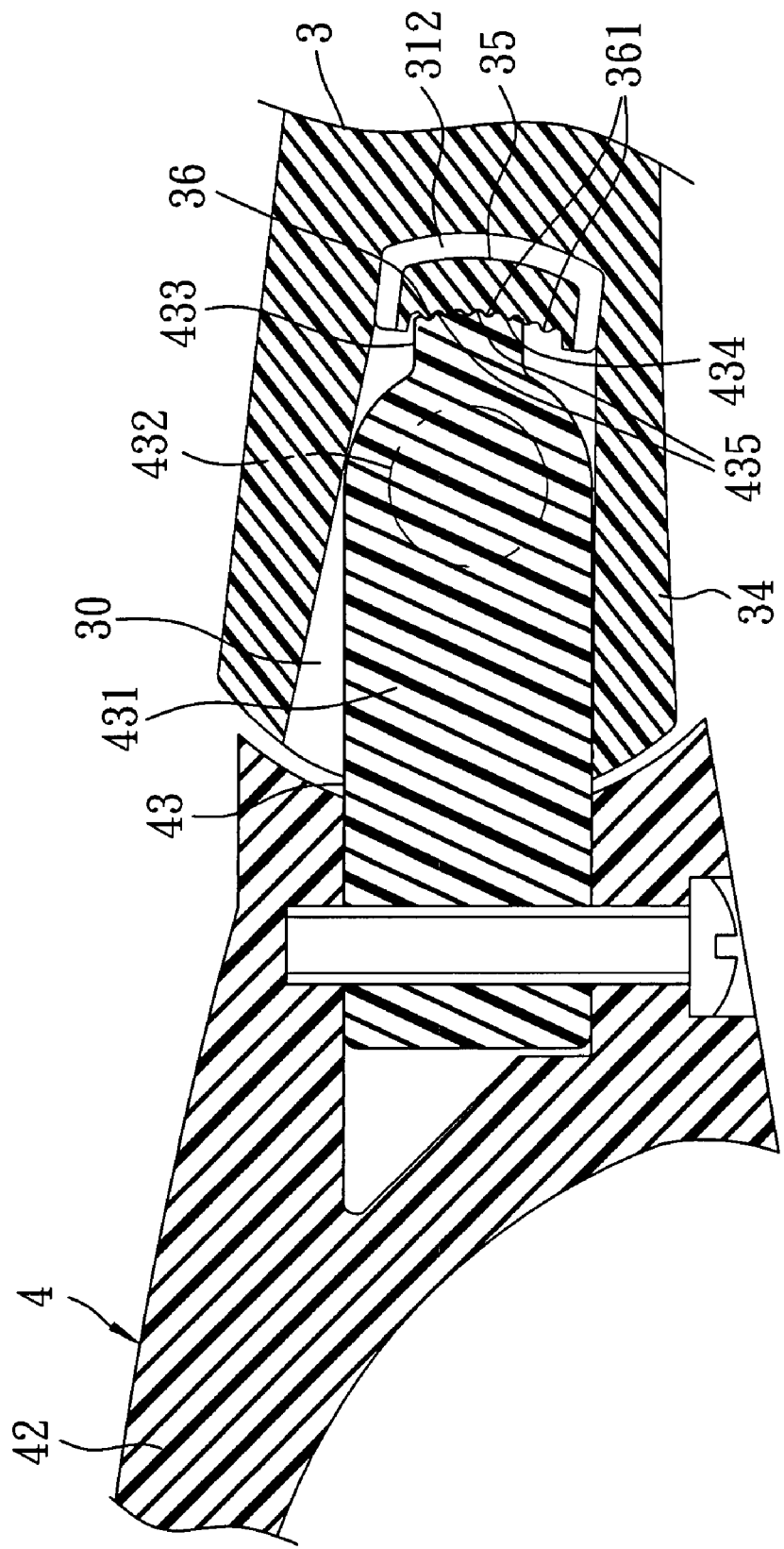
FIG. 7 is a view similar to FIG. 6, but showing the temple in an altered state of angle adjustment.

Referring to FIG. 4, each of the left and right ends of the frame 42 (only the left end is shown) is formed with a pivot recess 420. The connectors 43 are attached removably and respectively to the pivot recesses 420 by means of a fastening element, such as a screw. It is not necessary to have the connectors 43 mounted removably on the frame 42. For example, in another embodiment, the frame 42 may be designed such that the connectors 43 are fixedly incorporated therewith. Because the feature of the present invention does not reside in the specific configuration of the lens frame assembly 4, the present invention should not be limited to any particular configuration thereof disclosed herein.

When it is desired to adjust the temples 3, the temples 3 are first unfolded to an open position. From this position, the temples 3 may be vertically adjusted to suit the wearer's needs. During adjustment of one of the temples 3, the second teeth 435 of the second abutment face 434 of the corresponding connector 43 press resiliently against the corresponding first positioning protrusion 35. This resiliency facilitates pivoting of the temple 3. Since the first and second abutment faces 36, 434 are slanted as described above, the first teeth 361 mesh more fully with the second teeth 435 during such vertical adjustment of the temple 3, even when an outward force is applied to the temple 3 by the wearer. Such full meshing between the first and second teeth 361, 435, even at areas adjacent to the first vertical edges of the first and second abutment faces 36, 434, allows for precise adjustment of the temples 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. Eyeglasses adapted to be worn on a wearer's face comprising:
    a pair of temples each having a front end portion, and inner and outer surfaces respectively adjacent to and distal from the wearer's face, said front end portion of each of said temples being formed with a recess, each of said temples including a first positioning protrusion that is disposed in said recess and that defines a first abutment face formed with a plurality of vertically spaced apart first teeth; and
    a lens frame assembly including a pair of connectors extending rearwardly from opposite left and right ends of said lens frame assembly, each of said connectors being pivotally disposed in said recess of a respective one of said temples, and having a rearward end defining a second abutment face that is formed with a plurality of vertically spaced apart second teeth that mesh selectively with said first teeth of said first abutment face of the respective one of said temples to thereby allow for vertical adjustment of said temples;
    wherein each of said first and second abutment faces has a first vertical edge proximate to said inner surface of a respective one of said temples, and a second vertical edge proximate to said outer surface of the respective one of said temples, each of said first and second abutment faces being slanted such that said first vertical edge is more forwardly positioned than said second vertical edge thereof.

2. The eyeglasses as claimed in claim 1, wherein, for each pair of said first and second abutment faces, one of said first and second abutment faces is concavely shaped in a vertical direction and the other of said first and second abutment faces is convexly shaped in a vertical direction.

3. The eyeglasses as claimed in claim 2, wherein said inner surface of each of said temples is formed with an approximately C-shaped aperture in spatial communication with a respective one of said recesses, said aperture being defined by interconnection of a top section, a bottom section, and a rear section that surround respectively an upper, a lower, and a rear portion of a respective one of said first positioning protrusions.

4. The eyeglasses as claimed in claim 3, wherein said inner surface of each of said temples is further formed with a pivot hole in spatial communication with a respective one of said recesses, and each of said connectors includes a joining member disposed in said recess of the respective one of said temples, a pivot member protruding from an inner surface of said joining member and rotatably disposed in said pivot hole of the respective one of said temples, and a second positioning protrusion extending rearwardly from said joining member and defining said second abutment face of said connector.

5. The eyeglasses as claimed in claim 4, wherein said lens frame assembly further includes a frame having said left and right ends of said lens frame assembly, and a pair of lenses mounted to said frame, said connectors being mounted respectively to said left and right ends of said lens frame assembly through said joining members.

6. The eyeglasses as claimed in claim 5, wherein said joining members are respectively and pivotally mounted to said left and right ends of said lens frame assembly.

7. The eyeglasses as claimed in claim 5, wherein said joining members are respectively and fixedly mounted to said left and right ends of said lens frame assembly.

* * * * *